United States Patent
Aumi et al.

(10) Patent No.: US 12,033,069 B2
(45) Date of Patent: Jul. 9, 2024

(54) PREDICTING OPTICAL FIBER MANUFACTURING PERFORMANCE USING NEURAL NETWORK

(71) Applicant: CORNING INCORPORATED, Corning, NY (US)

(72) Inventors: Siam B Aumi, Corning, NY (US); Abhishek Jain, Horseheads, NY (US); Jeffrey Byron Rosbrugh, Wrightsville Beach, NC (US)

(73) Assignee: Corning Incorporated, Corning, NY (US)

( * ) Notice: Subject to any disclaimer, the term of this patent is extended or adjusted under 35 U.S.C. 154(b) by 996 days.

(21) Appl. No.: 16/871,537

(22) Filed: May 11, 2020

(65) Prior Publication Data

US 2020/0364549 A1 Nov. 19, 2020

Related U.S. Application Data

(60) Provisional application No. 62/849,369, filed on May 17, 2019.

(51) Int. Cl.
*G06N 3/08* (2023.01)
*G06N 3/067* (2006.01)
(Continued)

(52) U.S. Cl.
CPC .............. *G06N 3/08* (2013.01); *G06N 3/067* (2013.01); *G06N 3/084* (2013.01); *G06V 10/774* (2022.01); *G06V 10/82* (2022.01)

(58) Field of Classification Search
CPC .......... G06N 3/08; G06N 3/067; G06N 3/084; G06N 3/045; G06N 5/01; G06N 20/10;
(Continued)

(56) References Cited

U.S. PATENT DOCUMENTS 4,561,871 A * 12/1985 Berkey ............. C03B 37/01217
65/412
5,661,553 A  8/1997 Auge et al.
(Continued)

FOREIGN PATENT DOCUMENTS

CN       107909107 A    4/2018
DE       19940775 A1    3/2001

OTHER PUBLICATIONS

Pathak, K. K., Ajay Kumar Kaviti, and M. S. Hora. "The application of neural networks in the preform design of the upsetting process." JOM 62 (2010): 55-59. (Year: 2010).*
(Continued)

*Primary Examiner* — Li B. Zhen
*Assistant Examiner* — Henry Nguyen
(74) *Attorney, Agent, or Firm* — Kevin L. Bray

(57) ABSTRACT

A machine accesses a stored dataset comprising, for each of multiple optical fiber preforms, a plurality of images of each optical fiber preform coupled with an indication of a number of fiber kilometers lost due to diameter upset of a cable built using optical fiber drawn from the optical fiber preform. Each image represents a portion of the optical fiber preform. The machine preprocesses the stored dataset to generate a training dataset. The machine trains, using the training dataset, a convolutional neural network (CNN) to predict diameter upset performance of an optical fiber preform based on visual information representing the optical fiber preform. The CNN comprises an input layer, a plurality of hidden layers, and an output layer. Each of the input layer and the plurality of hidden layers comprises a plurality of artificial neurons. The machine provides an output representing the trained CNN.

19 Claims, 11 Drawing Sheets

(51) Int. Cl.
*G06N 3/084* (2023.01)
*G06V 10/774* (2022.01)
*G06V 10/82* (2022.01)

(58) Field of Classification Search
CPC ...... G06N 20/20; G06V 10/774; G06V 10/82; G06V 2201/06; C03B 37/012
See application file for complete search history.

(56) References Cited

U.S. PATENT DOCUMENTS

| | | | |
|---|---|---|---|
| 9,073,623 B1* | 7/2015 | Suh | G01D 5/35316 |
| 9,109,883 B2* | 8/2015 | Ansari | G01B 11/18 |
| 9,939,390 B2 | 4/2018 | Faraldi et al. | |
| 2005/0134843 A1 | 6/2005 | Laue et al. | |
| 2015/0298208 A1* | 10/2015 | Gonda | B22D 11/114 |
| | | | 420/528 |
| 2016/0320219 A1* | 11/2016 | Hellevang | G01P 5/001 |
| 2018/0059162 A1* | 3/2018 | Leblanc | G01R 31/60 |
| 2018/0157923 A1* | 6/2018 | el Kaliouby, Jr. | G06V 40/174 |
| 2018/0211380 A1* | 7/2018 | Tandon | G06T 7/0012 |
| 2018/0369606 A1* | 12/2018 | Zhang | A61B 5/4836 |
| 2019/0061049 A1* | 2/2019 | Kubo | B23K 26/032 |
| 2020/0069292 A1* | 3/2020 | Abolmaesumi | A61B 8/5207 |
| 2020/0092552 A1* | 3/2020 | Coelho | H04N 19/147 |

OTHER PUBLICATIONS

International Search Report and Written Opinion of the International Searching Authority; PCT/US2020/032305; Mailed Aug. 6, 2020; 9 Pages; European Patent Office.

Krizhevsky et al; "Imagenet Classification With Deep Convolutional Neural Networks" Part of "Advances in Neural Information Processing Systems 25"; (NIPS 2012) Available at papers.nips.cc/paper/4824-imagenet-classification-with-deep-convolutional-neuralnetwork.

* cited by examiner

PREDICTING OPTICAL FIBER MANUFACTURING PERFORMANCE USING NEURAL NETWORK

This application claims priority under 35 USC § 119(e) from U.S. Provisional Patent Application Ser. No. 62/849,369, filed on May 17, 2019, and which is incorporated by reference herein in its entirety.

TECHNICAL FIELD

Embodiments pertain to optical fiber manufacturing. Some embodiments relate to neural networks. Some embodiments relate to predicting optical fiber manufacturing performance using a neural network.

BACKGROUND

Predicting optical fiber manufacturing performance is a difficult task that results in many expensive errors, as optical fiber preforms that perform poorly need to be replaced at a high monetary cost. Techniques for predicting optical fiber manufacturing performance may be desirable.

SUMMARY

Figure 1:
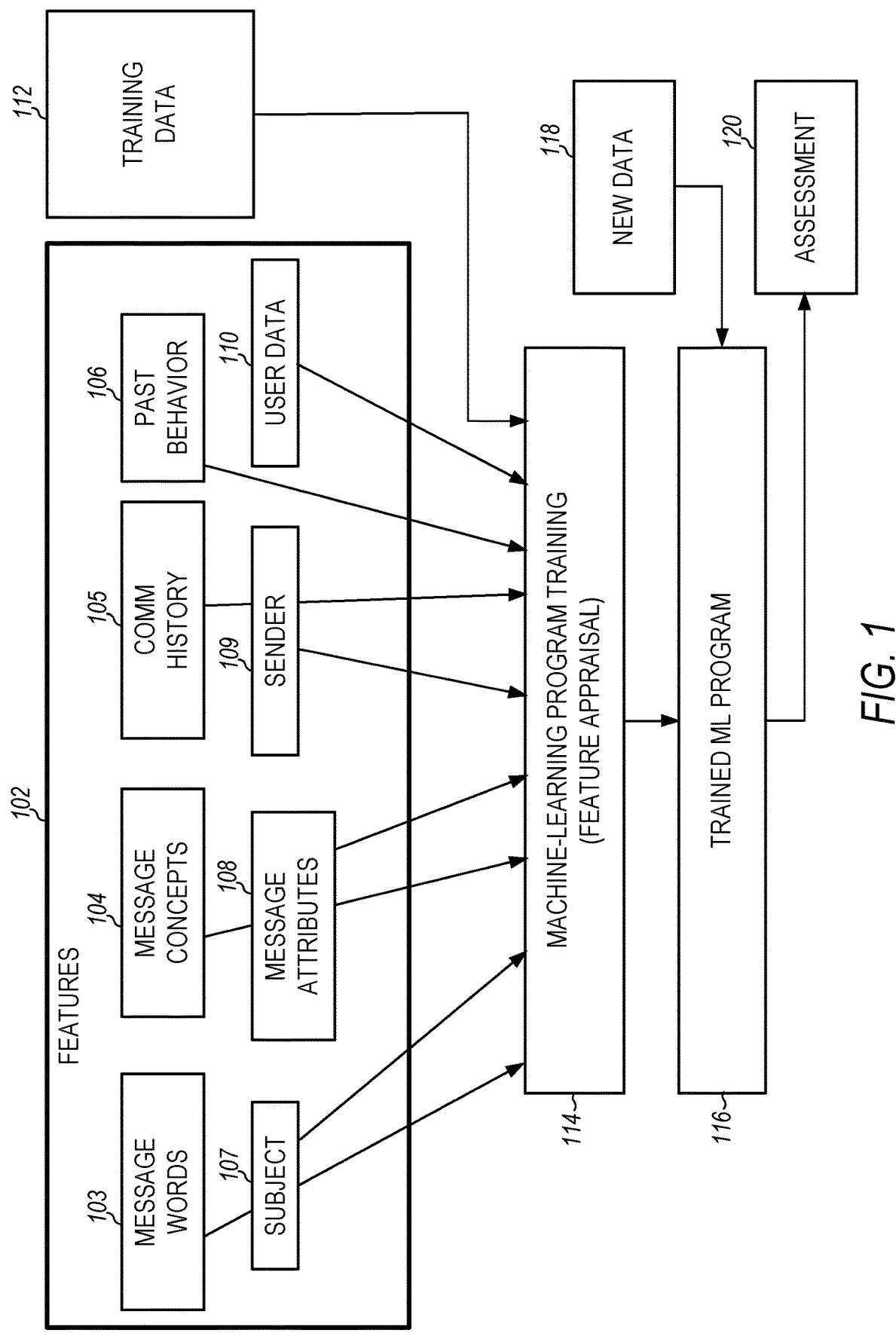
FIG. 1 illustrates the training and use of a machine-learning program, in accordance with some embodiments.

The present disclosure generally relates to machines configured to provide optical fiber manufacturing, including computerized variants of such special-purpose machines and improvements to such variants, and to the technologies by which such special-purpose machines become improved compared to other special-purpose machines that provide technology for optical fiber manufacturing. In particular, the present disclosure addresses predicting optical fiber manufacturing performance using a neural network.

According to some aspects of the technology described herein, a training method comprises accessing a stored dataset comprising, for each of multiple optical fiber preforms, a plurality of images of each optical fiber preform coupled with an indication of a number of fiber kilometers lost due to diameter upset of a cable built using the optical fiber preform, wherein each image represents a portion of the optical fiber preform. The training method comprises preprocessing the stored dataset to generate a training dataset. The training method comprises training, using the training dataset, a convolutional neural network (CNN) to predict diameter upset performance of an optical fiber preform based on visual information representing the optical fiber preform, the CNN comprising an input layer, a plurality of hidden layers, and an output layer, wherein each of the input layer and the plurality of hidden layers comprises a plurality of artificial neurons. The training method comprises providing an output representing the trained CNN.

According to some aspects of the technology described herein, an inference method comprises receiving input visual data representing a new optical fiber preform. The inference method comprises predicting, using a convolutional neural network (CNN), diameter upset performance of the new optical fiber preform, wherein the CNN is trained using a training dataset generated based on, for each of multiple optical fiber preforms, a plurality of images of each optical fiber preform coupled with an indication of a number of fiber kilometers lost due to diameter upset of a cable built using the optical fiber preform, wherein each image represents a portion of the optical fiber preform. The inference method comprises providing an output representing the predicted diameter upset performance of the new optical fiber preform.

Other aspects include a machine-readable medium storing instructions to perform one or more of the above methods and a system comprising processing circuitry and memory, the memory storing instructions which, when executed by the processing circuitry, cause the processing circuitry to perform one or more of the above methods.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, predicting optical fiber manufacturing performance is a difficult task that results in many expensive errors, as optical fiber preforms that perform poorly need to be replaced at a high monetary cost. Techniques for predicting optical fiber manufacturing performance may be desirable. Some aspects of the technology described herein relate to predicting optical fiber manufacturing performance using a neural network, for example, a convolutional neural network (CNN).

According to some aspects of the technology described herein, the CNN is trained by a training computing machine accessing a stored dataset. The stored dataset includes, for each of multiple optical fiber preforms, a plurality of images of each optical fiber preform coupled with an indication of a number of fiber kilometers lost due to diameter upset of a cable built using the optical fiber preform. Each image represents a portion of the optical fiber preform. The training computing machine preprocesses the stored dataset to generate a training dataset. The training computing machine trains, using the training dataset, the CNN to predict diameter upset performance of an optical fiber preform based on visual information representing the optical fiber preform. The CNN includes an input layer, a plurality of hidden layers, and an output layer. Each of the input layer and the plurality of hidden layers includes a plurality of artificial neurons. The training computing machine provides an output representing the trained CNN.

In some aspects, the trained CNN is provided to an inference computing machine for use thereat. The inference computing machine may be different from or the same as the training computing machine. The inference computing machine receives input visual data representing a new optical fiber preform. The inference computing machine predicts, using the trained CNN, diameter upset performance of the new optical fiber preform. The trained CNN is trained using a training dataset generated based on, for each of multiple optical fiber preforms, a plurality of images of each optical fiber preform coupled with an indication of a number of fiber kilometers lost due to diameter upset of a cable built using the optical fiber preform. Each image represents a portion of the optical fiber preform. The inference computing machine provides an output representing the predicted diameter upset performance of the new optical fiber preform.

Some aspects leverage a correlation between the number of particles and the diameter upsets. In some aspects, the CNN facilitates determining if additional features of how the particles are distributed and their size (i.e., not just the number of particles) may also manifest themselves as diameter upset events. The CNN implicitly determines the specific characteristics about particles and their distributions that are leading to draw upsets during training. In addition to diameter upsets, some aspects consider holes in the fiber. In some cases, a hole event is detected similar to a diameter upset event. It can be interpreted as a more severe, extended version of a diameter upset event.

As used herein, the term "convolutional neural network" or "CNN" may refer, among other things, to a neural network that is comprised of one or more convolutional layers (often with a subsampling step) and then followed by one or more fully connected layers as in a standard multi-layer neural network. In some cases, the architecture of a CNN is designed to take advantage of the 2D structure of an input image (or other 2D input such as a speech signal). This is achieved with local connections and tied weights followed by some form of pooling which results in translation invariant features. In some cases, CNNs are easier to train and have many fewer parameters than fully connected networks with the same number of hidden units. In some embodiments, a CNN includes multiple hidden layers and, therefore, may be referred to as a deep neural network (DNN). CNNs are generally described in "ImageNet Classification with Deep Convolutional Neural Networks," part of "Advances in Neural Information Processing Systems 25" (NIPS 2012) by Alex Krizhevsky, Ilya Sutskever, and Geoffrey E. Hinton, available at: papers.nips.cc/paper/4824-imagenet-classification-with-deep-convolutional-neural-networ, last visited 9 May 2019.

As used herein, the term "particle" encompasses any differentiable (via a dark-field imaging technique or any other machine imaging technique) non-uniformity in the glass that reflects or refracts light. Representative particles include voids, contaminants, entrapped gases, and solid particulate matter (e.g. cristobalite) entrained in the preform.

When used in reference to an optical fiber preform, the term "feature" refers to a characteristic of one or more of particles in the optical fiber preform. Particle characteristics include particle location, particle size, and spacings between particles. Particle location includes radial location and/or vertical location of the particle within or on the optical fiber preform. Radial location and vertical location are determined with respect to a central axis of the optical fiber preform. A central axis is any axis that passes through the center of the optical fiber preform. Particle size includes cross-sectional dimension, cross-sectional area and/or volume. Particle spacing refers to the distance between two particles. When used in reference to sets of three or more particles, particle spacing refers to the distance between each pair of particles in the set.

As used herein, the term "performance data" means manufacturing data or property data. "Manufacturing data" refers to data of the optical fiber as it is being manufactured and relates to properties or behavior of the optical fiber in the manufacturing process. Examples of manufacturing data include diameter upset event and length of fiber lost to diameter upset, time or length of fiber falling outside a manufacturing tolerance, variations in fiber size along the process pathway, amplitude and direction of fiber vibration along the process pathway, thickness and concentricity of coatings applied to fibers, and the like. Manufacturing data may also include manufacturing deficiencies, such as shorter fiber lengths resulting from pre- and post-breaks and coating upsets that also contribute to shorter lengths and increase downtime/reduced draw efficiency. "Property data" refers to properties of manufactured optical fibers. That is, to properties of optical fibers after conclusion of the manufacturing process. Property data includes optical properties (e.g. refractive index), structural properties (e.g. core diameter, cladding thickness, density, mechanical strength), and strength of adhesion of coatings to the cladding of the fiber, and the like.

As used herein, the term "label" means to associate performance data with an image of an optical fiber preform.

As used herein, "reference optical fiber preform" refers to an optical fiber preform used in the training of a CNN.

As used herein, "subject optical fiber preform" refers to an optical fiber preform distinct from a reference optical fiber preform.

As used herein, the phrase "diameter upset" encompasses its plain and ordinary meaning. A diameter upset event is detected at the diameter measurement point of fiber drawn from a preform. The diameter measurement point is positioned below the draw furnace and before coatings are applied to the fiber. A diameter measurement device is placed at the diameter measurement point and receives a fiber drawn from the preform. At the diameter measurement point, the fiber is glass with the composition of the preform and has no protective coatings disposed thereon. When the diameter measurement of the fiber exceeds a predefined upper or lower control limit, a diameter upset event begins. This event lasts as long as the diameter measurement remains outside the control limit band. The number of fiber kilometers lost is calculated using the period of time that the diameter remained outside the control limits and the draw speed. For example, suppose the fiber diameter set point is 1 mm, and the upper and lower control limits are 1.1 mm and 0.9 mm, respectively. Suppose that at time=0, the diameter measurement reads 1.2 mm. A diameter upset event is triggered. Suppose the diameter stays above 1.1 mm until time=5 seconds, at which point it returns to 1 mm. With a draw speed of 10 m/s, 50 m of fiber are lost due to the diameter upset event. The diameter upset may include total number of kilometers lost per preform. Alternatively, the diameter upset may be normalized to the number of possible kilometers per preform, for example a percentage of the total number of kilometers that are lost. In some cases, the latter measurement may be is more valuable or indicative of the performance of the preform. The normalized value has a more direct relationship to the decision structure. In some cases, if a preform is very small, and is expected to produce a significant number of kilometers in lost fiber, a decision to set that preform aside and draw a preform with higher likelihood of superior performance in a draw-constrained manufacturing environment may be made.

As used herein, the phrase "computing machine" encompasses its plain and ordinary meaning. A computing machine may include, among other things, a single machine with a processor and a memory or multiple machines that have access to one or more processors or one or more memories, sequentially or in parallel.

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning (ML) is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

Figure 2:
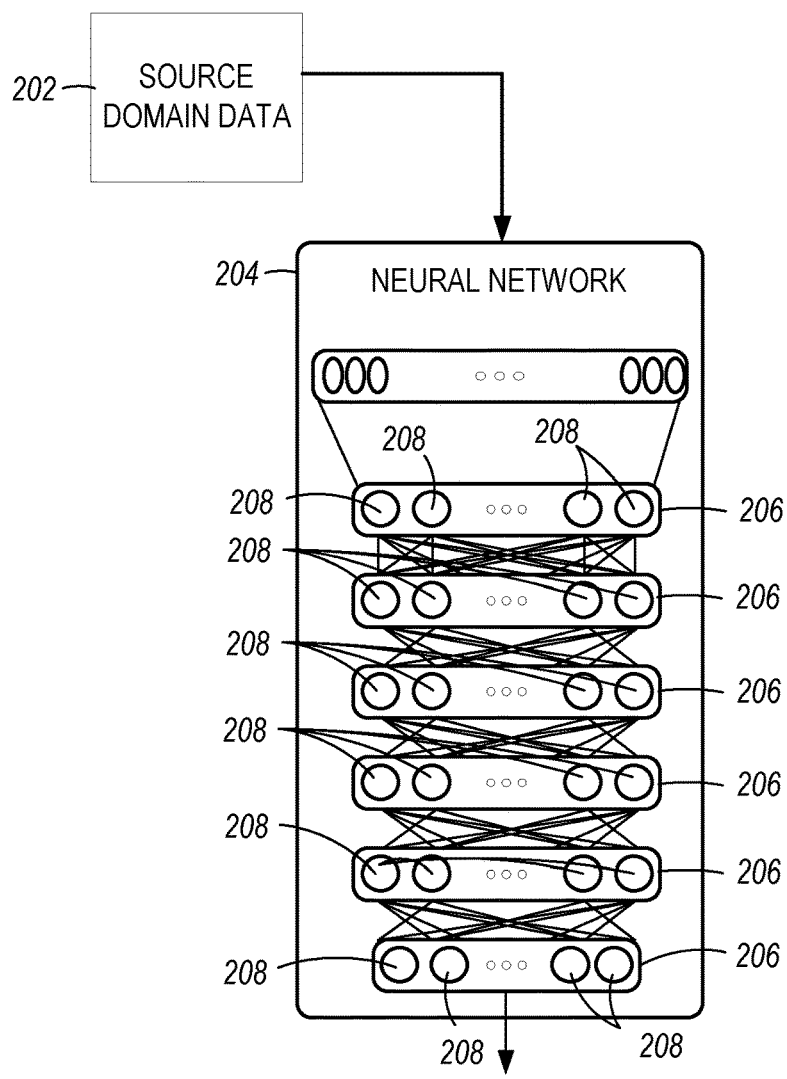
FIG. 2 illustrates an example neural network, in accordance with some embodiments.
Figure 2:
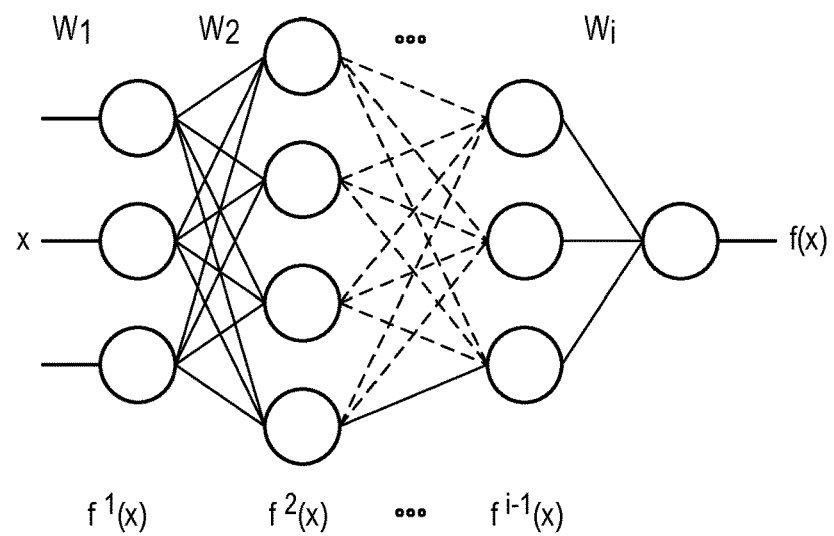

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1$, $W_2$, . . . , $W_i$ are applied to the input to each layer to arrive at $f^1(x)$, $f^2(x)$, . . . , $f^{i-1}(x)$, until finally the output f(x) is computed. The weights are established (or adjusted) through learning and training of the network. As shown, each of the weights $W_1$, $W_2$, . . . , $W_i$ is a vector. However, in some embodiments, the each of the weights may be a scalar.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of neural networks of biological brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images. A neural network is based on a collection of connected units called neurons, where each connection, called a synapse, between neurons can transmit a unidirectional signal with an activating strength (e.g., a weight as shown in FIG. 2) that varies with the strength of the connection. The weight applied for the output of a first neuron at the input of a second neuron may correspond to the activating strength. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the biological brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
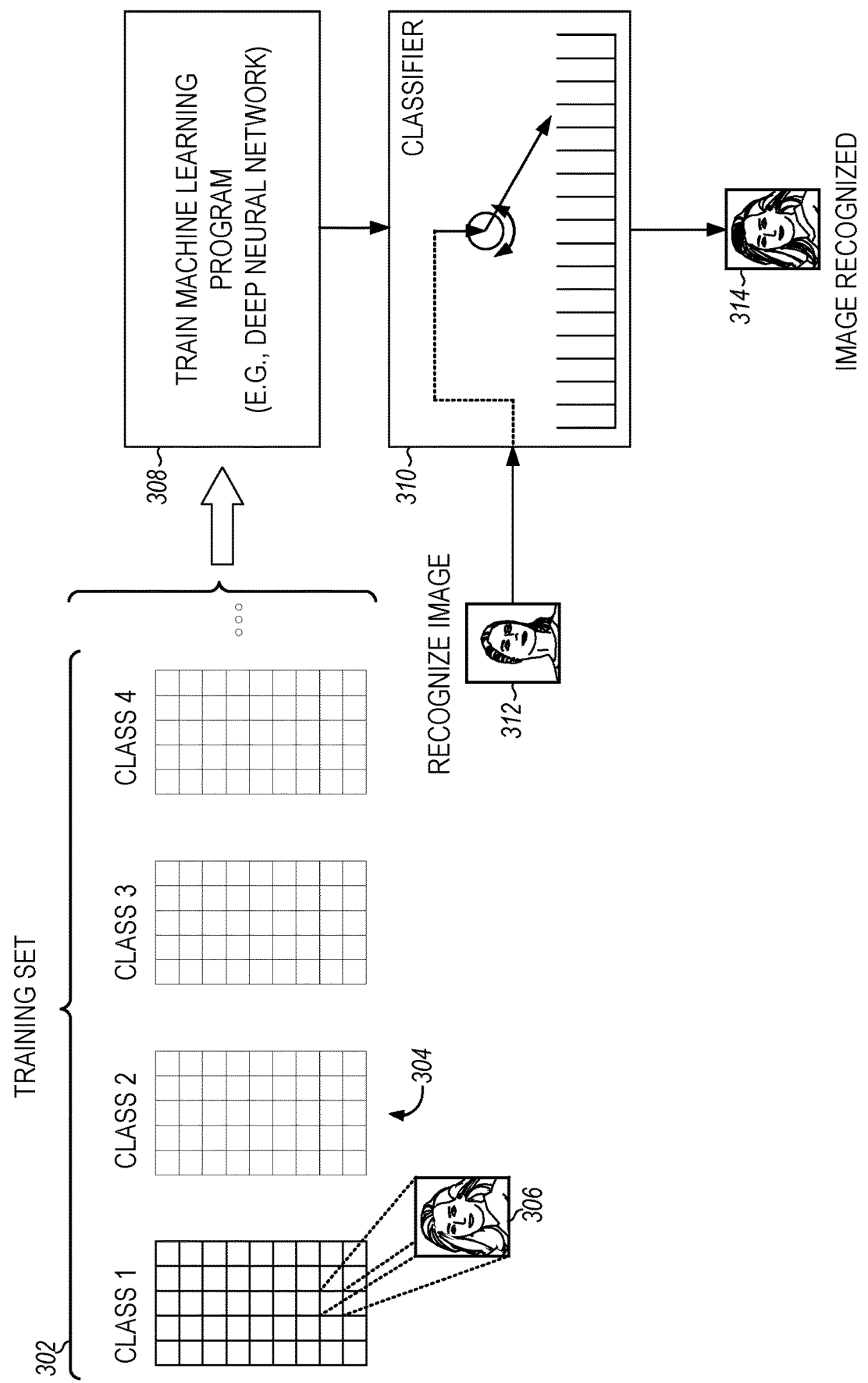
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
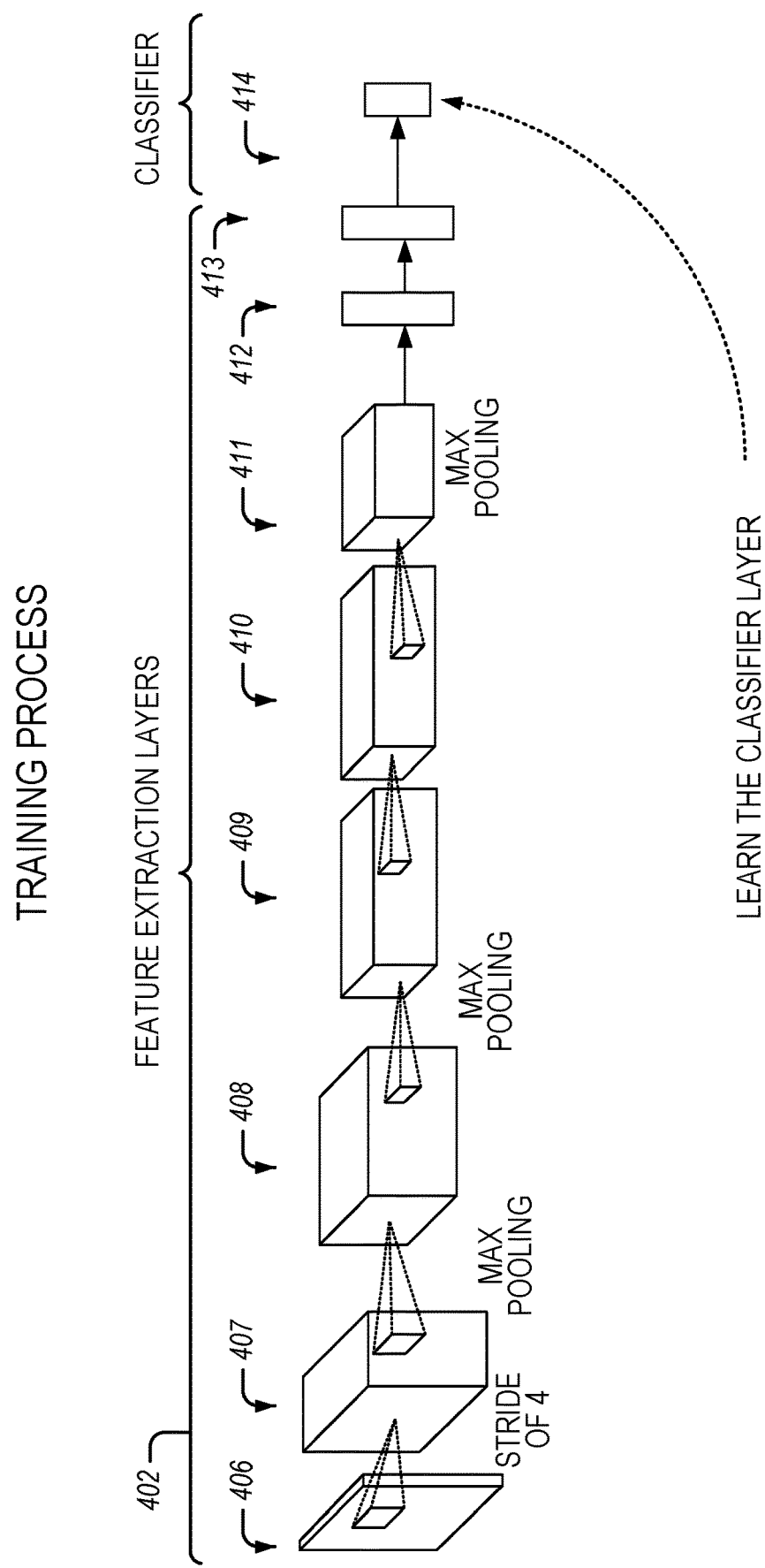
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the weights for all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the weights are identified at the different layers for accomplishing a desired task. The challenge is that for a typical neural network, there may be millions of weights to be optimized. Trying to optimize all these weights from scratch may take hours, days, or even weeks, depending on the amount of computing resources available and the amount of data in the training set.

Figure 5:
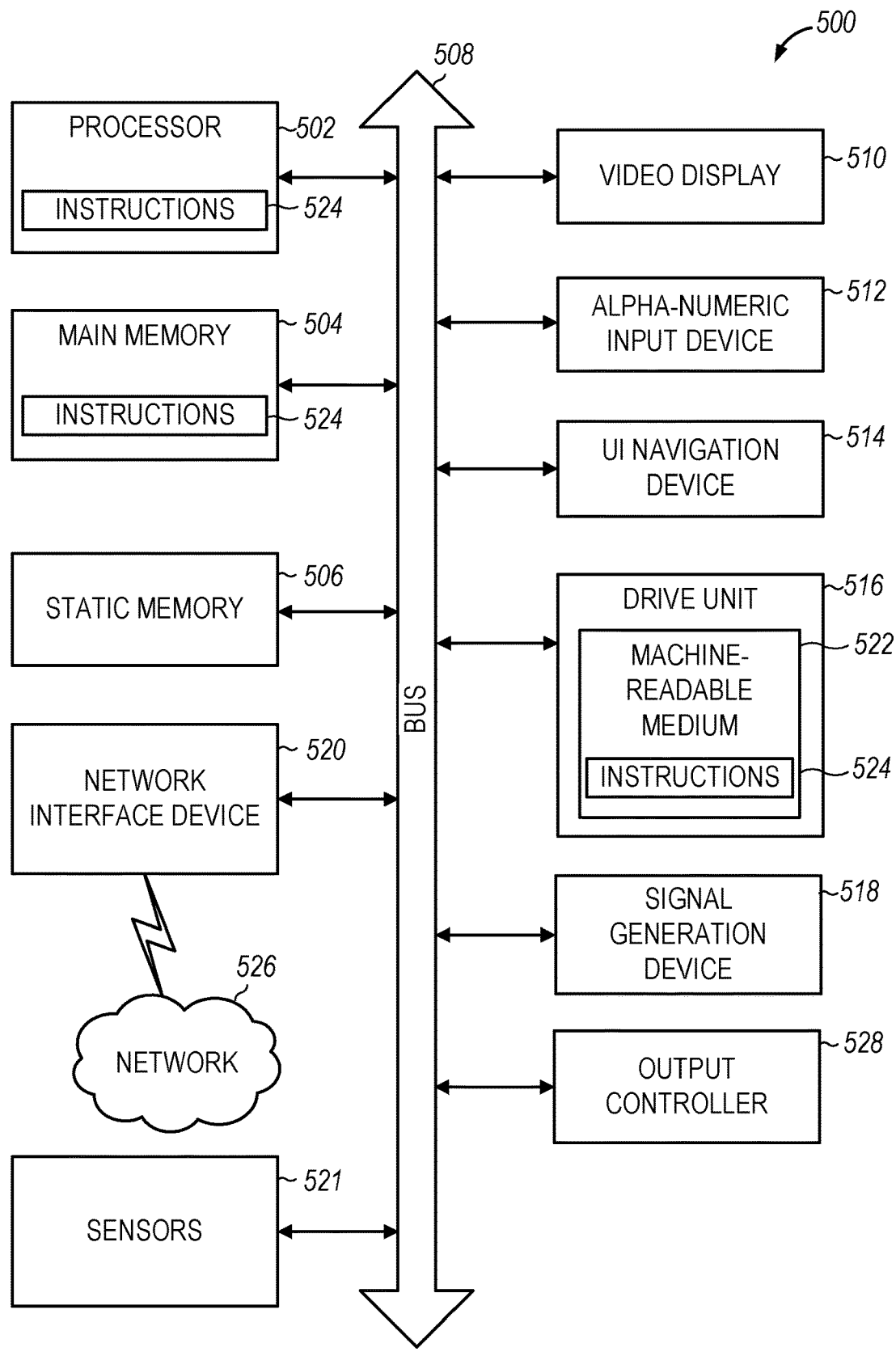
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

Figure 6:
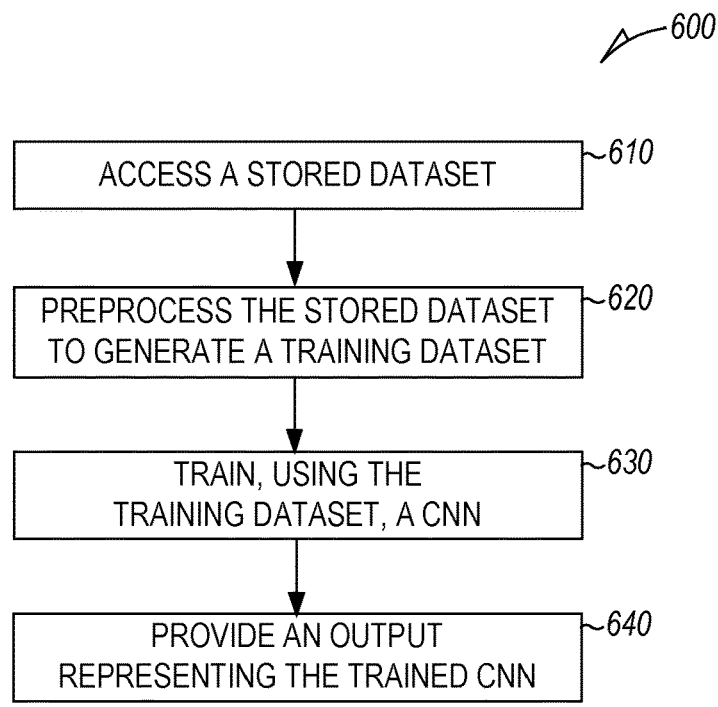
FIG. 6 is a flow chart illustrating an example method for training a convolutional neural network (CNN) to predict diameter upset performance of an optical fiber preform, in accordance with some embodiments.

FIG. 6 is a flow chart illustrating an example method 600 for training a convolutional neural network (CNN) to predict diameter upset performance of an optical fiber preform, in accordance with some embodiments. The method 600 may be implemented at a training computing machine. Performance data for the example method 600 is diameter upset. The scope of the disclosure extends to corresponding methods for other types of performance data.

Figure 10:
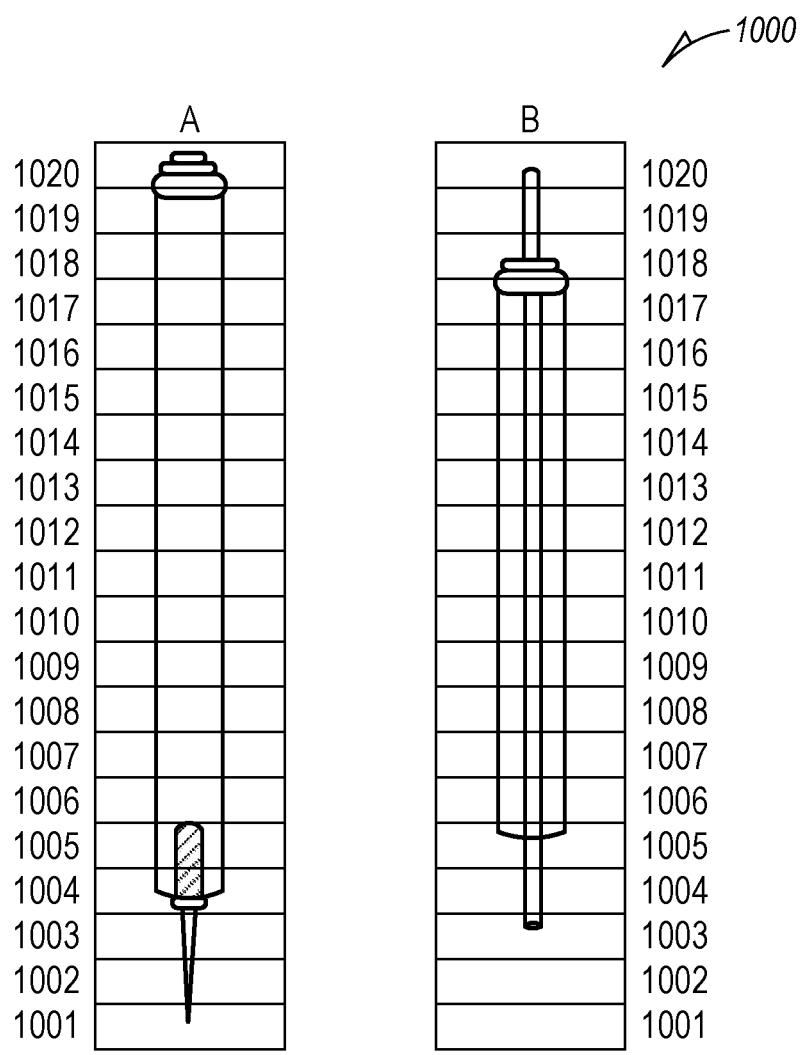
FIG. 10 illustrates example images of optical fiber preforms, in accordance with some embodiments.

At operation 610, the training computing machine accesses a stored dataset. The stored dataset includes, for each of multiple optical fiber preforms, a plurality of images of each optical fiber preform coupled with an indication of a number of fiber kilometers lost due to diameter upset using the optical fiber preform. Each image represents a portion of the optical fiber preform. In some cases, the plurality of images corresponds to parts of a single image, the parts being of equal sizes and segregated from the single image along a single (e.g., vertical) dimension. An example is shown in FIG. 10. In some cases, each image from the plurality of images represents a predetermined portion of the optical fiber preform.

At operation 620, the training computing machine preprocesses the stored dataset to generate a training dataset. In some cases, the training computing machine performs histogram equalization to enhance image contrast. The training computing machine crops the image to remove visual features that are not related to diameter upset performance or other performance data. In some examples, the cropped features are external to the optical fiber preform. The training computing machine resizes or rescales the image to optimize CNN computations. In some examples, the resizing or rescaling is done using a nearest neighbor algorithm. The training computing machine augments the image.

In some cases, the preform images are not directly being fed to the input layer of the CNN. There is a significant amount of image preprocessing that is being done before using the images for CNN training. The preprocessing modifies one or more images of the stored dataset to provide modified images of a training dataset. The modified images of the training dataset retain the label of the corresponding images of the stored dataset.

In some examples, the operations involved in preprocessing include one or more of: 1) histogram equalization of the grayscale image to intelligently enhance image contrast, 2) cropping the image so that visual features which are not related to diameter upsets are removed, 3) resizing and rescaling the image so that the number of CNN computations is reasonable and hence CNN training time is reasonable, 4) randomly augmenting some features such as shifting the preform in the image or editing the image so as to better generalize the training dataset; and 5) removing one or more images from the plurality of images. In some cases, a portion of the preform images is removed based on the position of the portion of the images (e.g., the highest one image and the lowest two images of the preform may be removed). Images with poor image quality may also be removed and/or defective regions within an image may be removed from an image.

Resizing and/or rescaling may be done using the technical computing library "numpy," using the nearest neighbor algorithm, in the python programming language. This is a preprocessing step since the size of the image (number of pixels) directly determines how much computational power will be needed to train the CNN. If the images are not resized, it may take days to train one instance of the CNN, hence making CNN tuning very time consuming since it requires trial-and-error with the CNN being trained multiple times. Rescaling images allows the training computing machine to train the CNN in a reasonable amount of time. The exact value of the final aspect ratio of the images is determined by keeping in mind that the training computing machine should not lose any important image features because of this downsampling. This is done by analyzing the accuracy of the final CNN model. The effect of rescaling and/or resizing on the CNN performance is determined experimentally. In other words, the training computing machine may track both the CNN accuracy as well as the training computation time while changing the scaling parameter in the preprocessing step. A value is chosen based on a trade-off between CNN accuracy and computational time.

At operation 630, the training computing machine trains, using the training dataset, a CNN to predict diameter upset performance of an optical fiber preform based on visual information representing the optical fiber preform. The CNN includes an input layer, a plurality of hidden layers, and an output layer. Each of the input layer and the plurality of hidden layers includes a plurality of artificial neurons. In some cases, the diameter upset performance of the optical fiber preform corresponds to the number of fiber kilometers (or other unit of distance) lost due to diameter upset. In some cases, the CNN uses a random forest classifier.

Figure 11A:
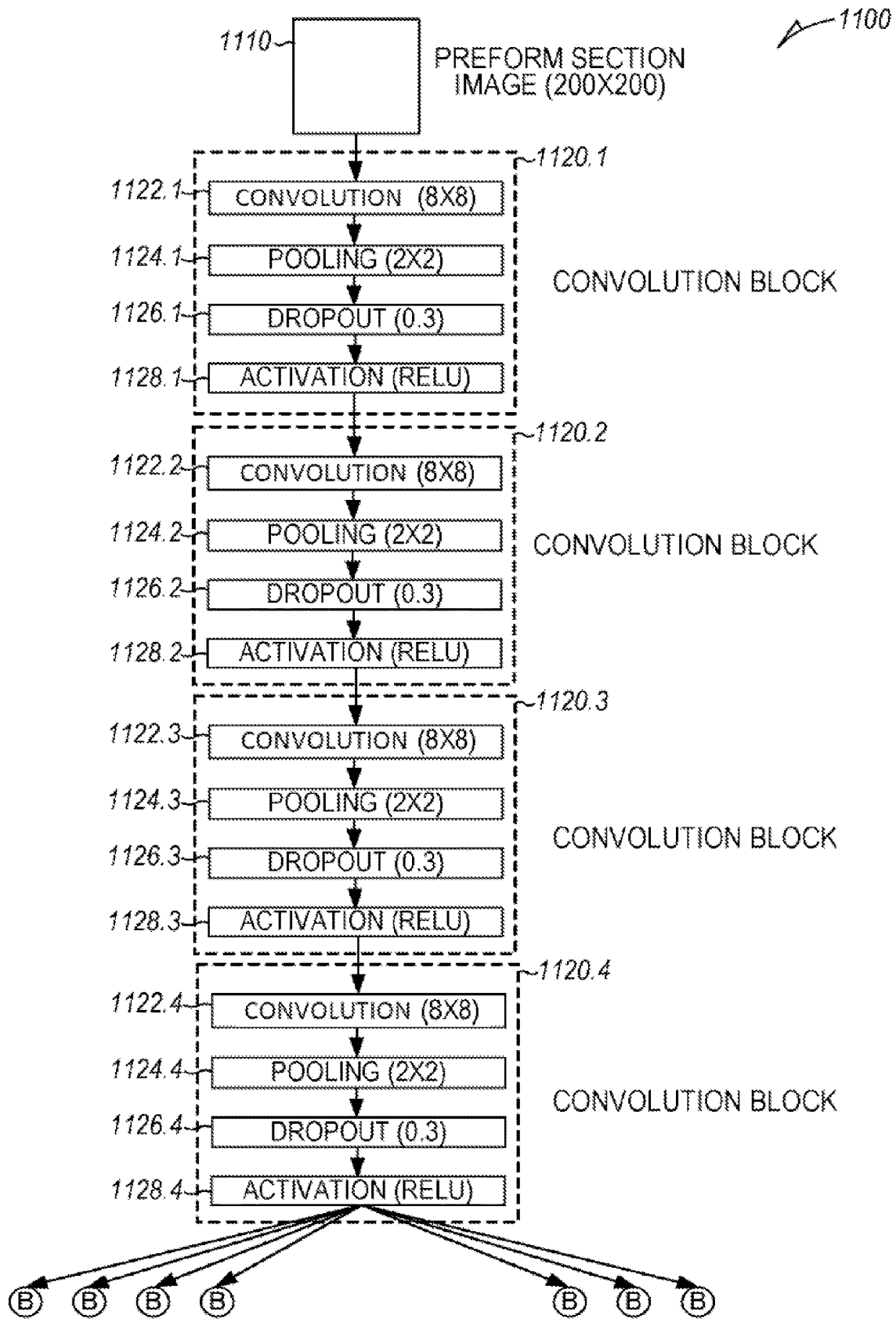
FIGS. 11A-11B illustrate an example architecture for a convolutional neural network (CNN), in accordance with some embodiments.
Figure 11B:
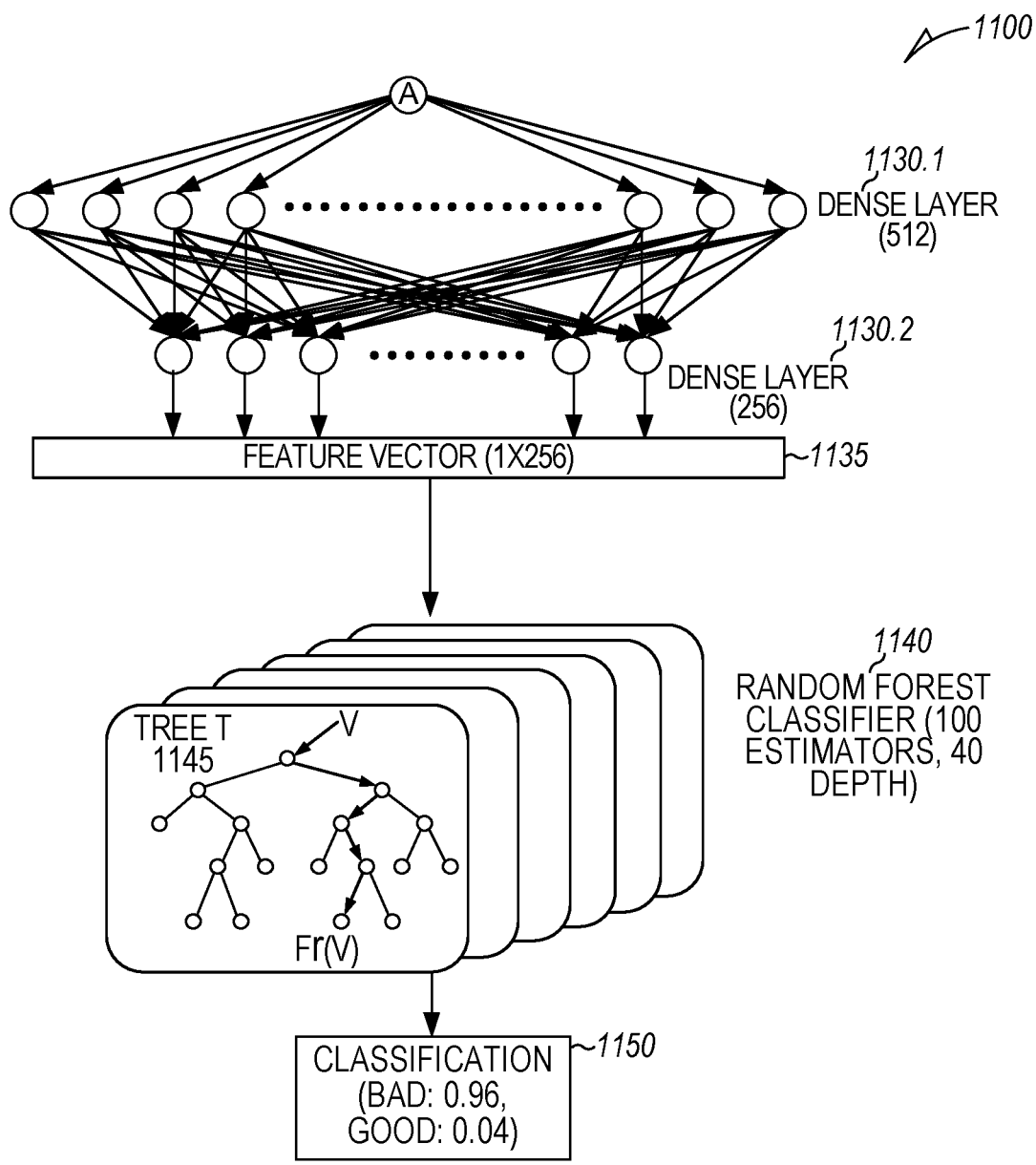

The CNN may have any known CNN architecture. In some examples, the CNN architecture illustrated in FIGS. 11A-11B is used. In some cases, the CNN includes: multiple convolution blocks, where a first one of the convolution blocks receives input visual data; multiple dense layers following the convolution blocks; a feature vector generated by the multiple dense layers; and a random forest classifier processing the feature vector to generate a classification. The classification indicates whether the number of fiber kilometers lost due to diameter upset of the cable built using the optical fiber preform is likely to exceed a threshold value.

In some cases, the training computing machine computes, for each of the multiple optical fiber preforms, radial positions of particles and axial positions of the particles in each optical fiber preform. Each radial position is computed using at least two images and an angular movement between the at least two images. The CNN is trained based on the radial positions of the particles, the axial positions of the particles, and relative positions of the particles to one another.

It should be noted that particles may include both surface and interior features. Particles detected by the preform analyzer (PFA) may have very different properties. For the most part, their composition includes $SiO_2$, but gaseous bubbles, voids, and impurities may be detected as particles also. The size, number, and distribution of particles may vary based on the preform so it is difficult to make generalizations. Some common observations are: (1) a percentage of the particles are detected at the cane-overclad interface, and (2) some of the detected particles do not manifest themselves into any form of fiber defects; rather, they are simply "melted" out during the draw process (e.g. particles diffuse out of the glass or homogenize with the glass at the high process temperatures used to draw fibers from preforms). The origin of particle(s) may include one or more of the following: (1) contamination during deposition and handling in the blank fabrication process, (2) raw material impurities, raw material supply fluctuations during deposition, and upsets at the overclad laydown, (3) equipment issues (e.g., burner build-up, dirty furnace, etc.) at overclad laydown and/or consolidation, and (4) process upsets/faults at the overclad laydown and/or consolidation.

At operation 640, the training computing machine provides an output representing the trained CNN. In some cases, the trained CNN is provided to an inference computing machine for use thereat. In some cases, the output representing the trained CNN includes tuned weights or parameters of the plurality of hidden layers of the CNN.

In some cases, the inference computing machine receives input visual data representing a new optical fiber preform. The inference computing machine determines that the number of fiber kilometers lost due to diameter upset for the new optical fiber preform exceeds a threshold number. The inference computing machine causes termination of fabrication of the new optical fiber preform in response to the number of fiber kilometers lost exceeding the threshold number.

In some cases, the inference computing machine receives input visual data representing a new optical fiber preform. The inference computing machine determines that the number of fiber kilometers predicted to be lost due to diameter upset for the new optical fiber preform is below a threshold number. The inference computing machine causes fabrication of the new optical fiber preform in response to the predicted number of fiber kilometers lost being below the threshold number.

In some cases, the PFA uses a "dynamic" imaging process. This "tracks" the particles in a tightly controlled (in terms of movement) sequence of images. Essentially, using knowledge of the (controlled) movement of the specimen under test, we can determine the position of the particles (radially) in the specimen.

Figure 7:
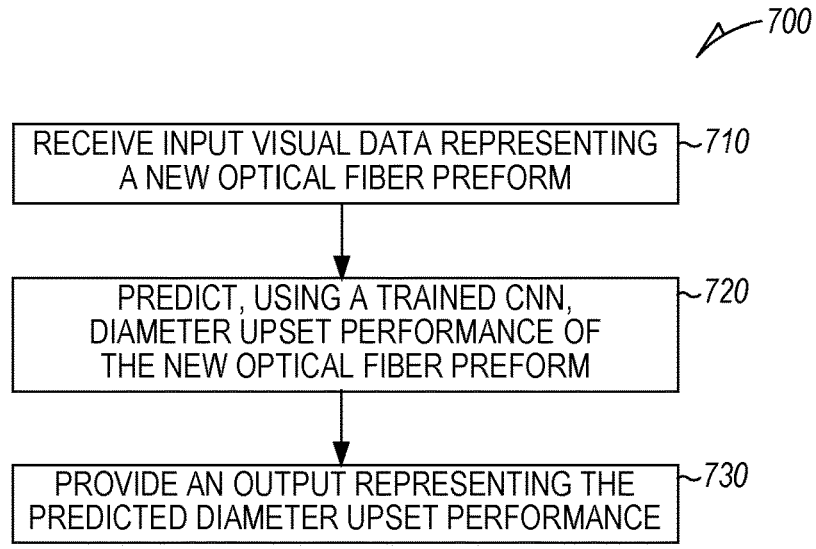
FIG. 7 is a flow chart illustrating an example inference method for using a convolutional neural network (CNN) to predict diameter upset performance of an optical fiber preform, in accordance with some embodiments.

FIG. 7 is a flow chart illustrating an example inference method 700 for using a convolutional neural network (CNN) to predict diameter upset performance of an optical fiber preform, in accordance with some embodiments. The method 700 may be implemented at the inference computing machine, which may be the same as or different from the training computing machine.

At operation 710, the inference computing machine receives input visual data representing a new optical fiber preform.

At operation 720, the inference computing machine predicts, using the trained CNN, diameter upset performance of the new optical fiber preform. The CNN is trained using a training dataset generated based on, for each of multiple optical fiber preforms, a plurality of images of each optical fiber preform coupled with an indication of a number of fiber kilometers lost due to diameter upset of a cable built using the optical fiber preform. Each image represents a portion of the optical fiber preform. In some cases, the diameter upset performance of the new optical fiber preform corresponds to a predicted number of fiber kilometers lost due to diameter upset.

At operation 730, the inference computing machine provides an output representing the predicted diameter upset performance of the new optical fiber preform. In some cases, the output representing the predicted diameter upset performance of the new optical fiber preform includes a set of confidence levels (e.g., represented as probabilities) and a feature matrix. Each confidence level in the set of confidence levels corresponds to a class in a set of classes. The feature matrix is used, in one embodiment, in a Random Forest machine learning classifier to increase an accuracy of the set of confidence levels.

In some cases, the inference computing machine determines that the predicted number of fiber kilometers lost due to diameter upset for the new optical fiber preform exceeds a threshold number. The inference computing machine causes termination of fabrication of the new optical fiber preform in response to the predicted number of fiber kilometers lost exceeding the threshold number.

In some cases, the inference computing machine determines that the predicted number of fiber kilometers lost due to diameter upset for the new optical fiber preform is below a threshold number. The inference computing machine causes fabrication of the new optical fiber preform in response to the predicted number of fiber kilometers lost being below the threshold number.

In some cases, the output is a real-valued vector, where the vector length is equal to the number of classes in the training set. Each element of this vector is a value between 0 and 1, which represents the confidence level (e.g. probability) of the CNN predicting the particular class for the input image. In some cases, 0 represents the lowest confidence of predicting a BAD blank, while 1 represents the highest confidence in predicting a BAD blank. This is very useful in determining whether human engineer(s) should take action based on the CNN output. If the CNN confidence value is approximately 0.5 (or another value) for a certain datapoint, then an action taken (e.g., judging the preform to be BAD) based on this CNN classification may not be a good idea (in other words, the CNN result, in this case, might be inconclusive). Note that the value of 0.5 mentioned above only holds for binary classification tasks (such as the GOOD/BAD preform classification described in some aspects).

Figure 8:
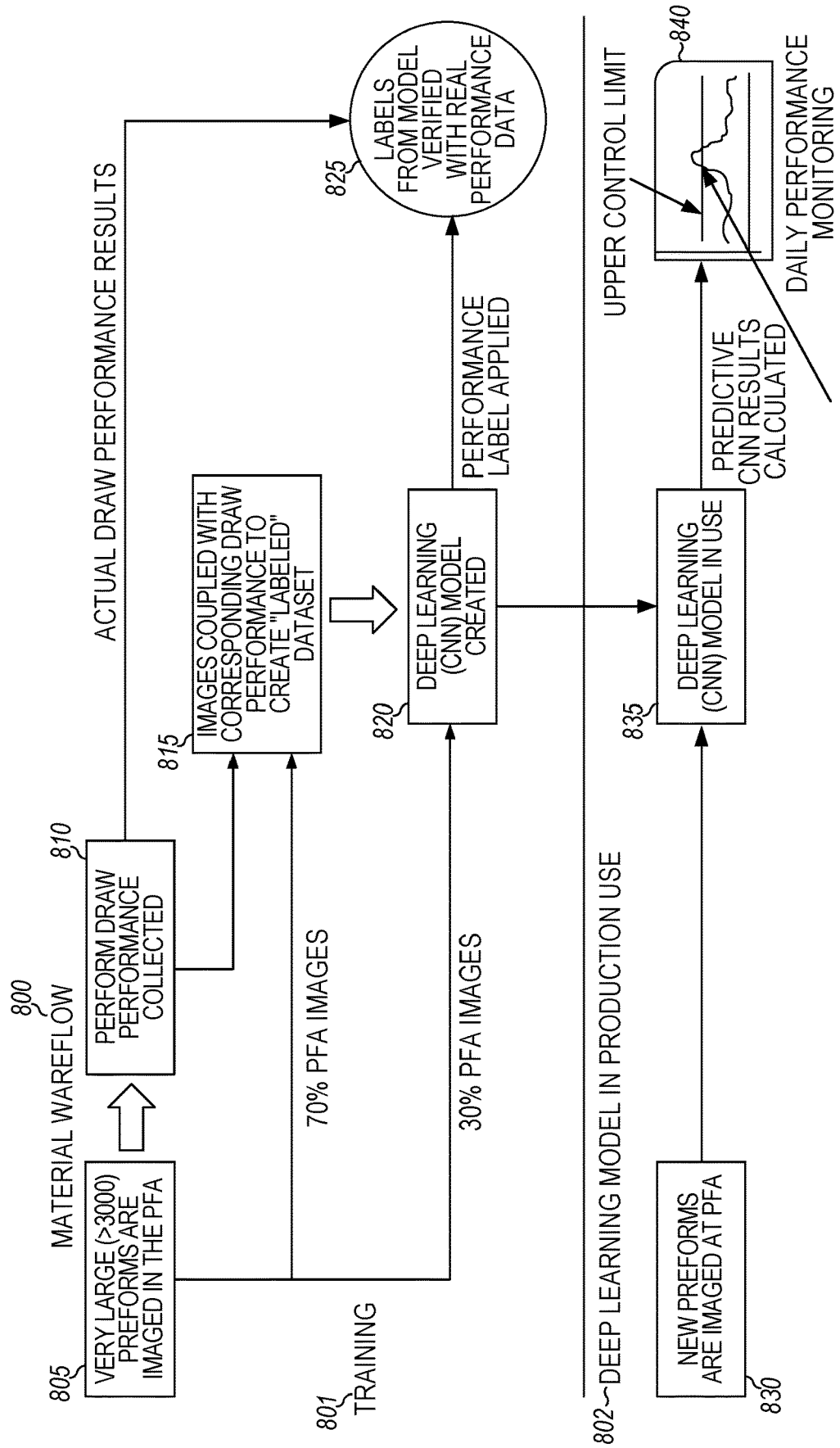
FIG. 8 is a material wareflow diagram for training and using a convolutional neural network (CNN) to predict diameter upset performance of an optical fiber preform, in accordance with some embodiments.

FIG. 8 is a material wareflow diagram 800 for training and using a convolutional neural network (CNN) to predict diameter upset performance of an optical fiber preform, in accordance with some embodiments.

As shown, the material wareflow diagram 800 illustrates a training phase 801 and a deep learning model in production use phase 802.

In the training phase 801, at block 805 multiple (e.g., more than 3000) preforms are imaged in the preform analyzer (PFA) and provided to blocks 810, 815, and 820. In one embodiment, block 815 gets 70% of the PFA images, and block 820 gets 30% of the PFA images. In other embodiments, other percentages may be used. At block 810, the preform draw performance is collected and provided to block 815. Actual draw performance results are provided to block 825. At block 815, images are coupled with a corresponding draw performance to create a "labeled" dataset. The labeled dataset is provided to block 820. At block 820, a deep learning (e.g., CNN) model is created. The deep learning model is provided to block 825 with performance labels applied. The deep learning model is also provided to block 835 of the deep learning model in production use phase 802. At block 825, the labels from the model are verified with real performance data.

In deep learning model in production use phase 802, at block 830, new preforms are imaged at the PFA and provided to block 835. At block 835, the deep learning (e.g., CNN) model is used and predictive CNN results are calculated and provided to block 840. At block 840, daily performance monitoring is performed, and an upper control limit is specified.

Figure 9:
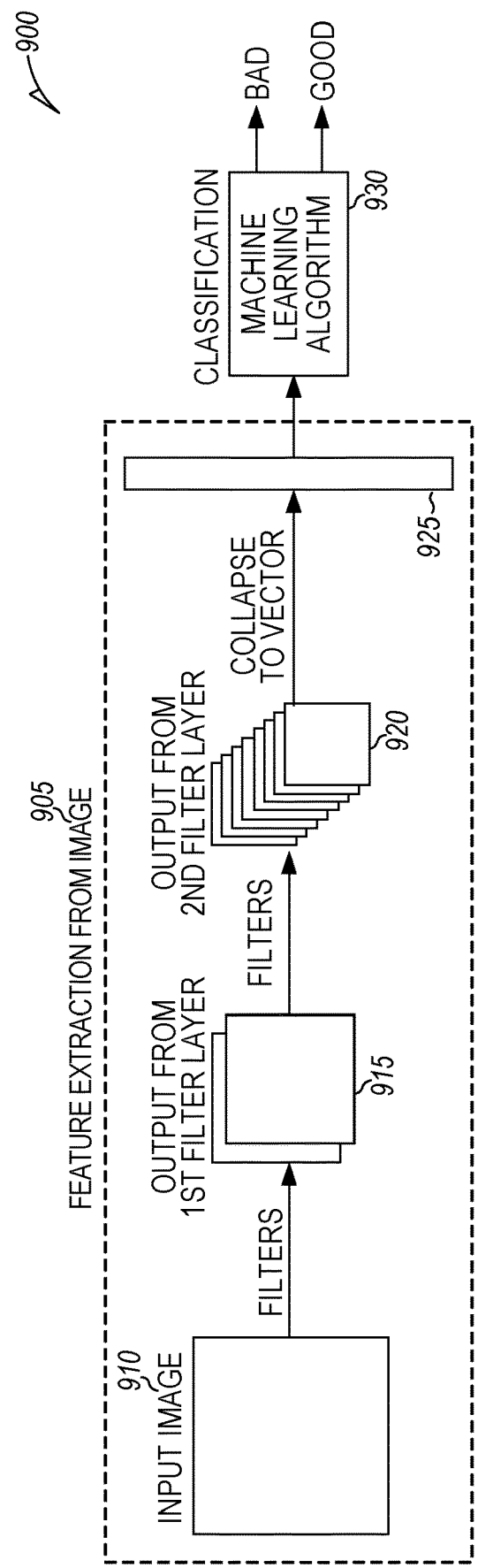
FIG. 9 is a data flow diagram for feature extraction and classification using a convolutional neural network (CNN) to predict diameter upset performance of an optical fiber preform, in accordance with some embodiments.

FIG. 9 is a data flow diagram 900 for feature extraction and classification using a convolutional neural network (CNN) to predict diameter upset performance of an optical fiber preform, in accordance with some embodiments.

As shown, in the feature extraction from image block 905, an input image 910 is provided. The input image 910 is passed through filters to generate the output from the first filter layer 915. Additional filters are used to generate the output from the second filter layer 920. The output from the second filter layer 920 is collapsed to a vector 925. The vector 925 is provided to a machine learning algorithm 930 in the classification phase. The classification phase outputs "good" or "bad" depending on whether the number of fiber kilometers lost due to diameter upset of the cable built using optical fiber drawn from the optical fiber preform is predicted to exceed a threshold value.

FIG. 10 illustrates example images 1000 of optical fiber preforms, in accordance with some embodiments. As shown, two images A and B are shown, and each rectangular image is divided into 20 parts 1001-1020, with each part of the image encompassing 1/20 of the height of the image and the entire width. In other embodiments, each rectangular image may be divided into n parts, with each part of the image encompassing 1/n of the height of the image and the entire width, where n is a positive integer. While two images A and B are shown in FIG. 10, the technology described herein may be implemented with a larger number (e.g., thousands) of images.

FIGS. 11A-11B illustrates an example architecture for a convolutional neural network (CNN) 1100, in accordance with some embodiments.

As shown in FIG. 11A, the input to the CNN 1100 is a preform section image (e.g., having dimensions 200×200 pixels). The input is passed through four (or any other number, e.g., one or two or more) convolution blocks 1120.1-4. As shown, each convolution block 1120.k (where k is a number between 1 and 4) includes a convolution layer 1122.k (e.g., having dimensions 8×8 pixels), a pooling layer 1124.k (e.g., having dimensions 2×2 pixels), a dropout layer 1126.k (e.g. 0.3), and an activation layer 1128.k (e.g., rectified linear unit (reLu) function).

The convolution layer's 1122.k parameters consist of a set of learnable filters. Every filter is small spatially (along width and height), but extends through the full depth of the input volume. During the forward pass, the computing machine slides (more precisely, convolve) each filter across the width and height of the input volume and computes dot products between the entries of the filter and the input at any position. As the computing machine slides the filter over the width and height of the input volume, it produces a two-dimensional activation map that gives the responses of that filter at every spatial position. Intuitively, the network learns filters that activate when they see some type of visual feature such as an edge of some orientation or a blotch of some color on the first layer, or eventually entire honeycomb or wheel-like patterns on higher layers of the network. Now, the computing machine has an entire set of filters in each convolution layer 1122.k, and each of them produces a separate two-dimensional activation map. The computing machine stacks these activation maps along the depth dimension and produces the output of the convolution layer.

The function of the pooling layer 1124.k is to progressively reduce the spatial size of the representation to reduce the number of parameters and the amount of computation in the network, and hence to also control overfitting. The pooling layer 1124.k operates independently on every depth slice of the input and resizes it spatially, using the MAX operation. The most common form is a pooling layer 1124.k with filters of size 2×2 applied with a stride of 2 downsamples every depth slice in the input by 2 along both width and height, discarding 75% of the activations. Every MAX operation would in this case be taking a max over 4 numbers (little 2×2 region in some depth slice).

The dropout layer 1126.k drops out hidden or visible units from the CNN 1100. The activation layer 1128.k applies an elementwise activation function, such as the reLu function max(0,x) to its input.

As shown in FIG. 11B, the output of the last convolution block 1120.4 is provided to the first of two (or another number such as one or more than two) dense layers 1130. As shown, the first dense layer 1130.1 has dimensions of 512 neurons and the second dense layer 1130.2 has dimensions of 256 neurons. However, in other embodiments, there may be another number of dense layers and/or the dense layers may have other dimensions. Dense layers 1130 are layers of a neural network that lack prior knowledge about the type of data that they are processing.

As shown in FIG. 11B, the output of the last dense layer 1130.2 is represented in a feature vector 1135. As shown, the feature vector 1135 has dimensions 1×256. However, in other implementations, other dimensions may be used. The feature vector 1135 is input to a random forest classifier 1140. The random forest classifier 1140 produces a classification 1150, which outputs "good" or "bad" depending on whether the number of fiber kilometers lost due to diameter upset of the cable built using optical fiber drawn from the optical fiber preform is predicted to exceed a threshold value.

The random forest classifier 1140 performs an ensemble learning method for classification and/or regression. The random forest classifier 1140 operates by constructing a multitude of decision trees 1145 and outputting the class that is the mode of the classes (classification) or mean prediction (regression) of the individual decision trees 1145.

FIGS. 11A-11B illustrates a structure of a CNN 1100 that may be used with some embodiments of the technology disclosed herein. "Inception" is a CNN used for facial recognition. The CNN 1100 may, in some cases, have a smaller and less complex structure than Inception. The larger and more complex structure of Inception results in very large number of computations that need to be performed to train the CNN (hence increasing the training time significantly). Another reason a smaller structure may be useful is that larger structures are needed to extract thousands of features from color images. The preform images used in the technology disclosed herein are, in some cases, greyscale images. Furthermore, since it is manufacturing data, preform images do not have as many features as in facial images. Hence a smaller CNN structure (connected to the random forest classifier 1140) may be used. Furthermore, the CNN 1100 may be trained from scratch, as opposed to using transfer learning as in the Inception CNN.

In some implementations a training computer (or combination of multiple training computers) includes processing circuitry (e.g., one or more processing units) and memory. The memory stores a CNN. The processing circuitry accesses a stored dataset. The stored dataset includes, for each of multiple reference optical fiber preforms, a plurality of images of the reference optical fiber preform labelled with performance data (e.g., manufacturing data) of optical fiber drawn from the reference optical fiber preform. Each image represents a different portion of the reference optical fiber preform. The processing circuitry preprocesses the stored dataset to generate a training dataset derived from the stored dataset. The training dataset includes modified images obtained from the plurality of images in the stored dataset. The preprocessing may include, among other things, enhancement of contrast, cropping, resizing, rescaling, editing or removing an image of the plurality of images of the stored dataset or the training dataset. The processing circuitry trains the CNN. The training includes providing data (e.g., the stored dataset and/or the training dataset) to the CNN. The CNN processes the data to classify the reference optical fiber into two or more categories.

The training may include extracting a feature from an image of the stored dataset or a modified image of the training dataset. In some cases, the feature is extracted from a plurality of images of the stored dataset or a plurality of modified images of the training dataset. In some cases, the feature includes a location of a particle in the reference optical fiber preform. In some cases, the location is a radial location of the particle. In some cases, the feature includes locations of multiple particles in the reference optical fiber preform. In some cases, the feature includes a size of one or more particles in the reference optical fiber preform. In some cases, the feature includes a particle spacing in the reference optical fiber preform. In some cases, the two or more categories distinguish the reference optical fiber preform on the basis of the feature.

As used herein, manufacturing data may include, among other things, diameter upset, the length of fiber lost due to diameter upset or property data (e.g., refractive index).

In some cases, the plurality of images of each of the reference optical fiber preforms includes images acquired at two different angles about a central axis of the reference optical fiber preform.

In some cases, the CNN includes an input layer, a plurality of hidden layers and an output layer. The plurality of hidden layers include a first layer connected to the input layer, a second layer connected to the output layer and one or more intermediate layers between the first layer and the second layer. Each of the input layer, hidden layers and output layers include a plurality of artificial neurons.

In some cases, the artificial neurons of the input layer are connected to the artificial neurons of the first layer of the hidden layers with a connection strength defined by a first set of weights. The artificial neurons of the intermediate layers are connected to each other with a connection strength defined by a second set of weights. The artificial neurons of the output layer are connected to the artificial neurons of the second layer with a connection strength defined by a third set of weights. The training includes processing the data to establish one or more of the first set of weights, the second set of weights, and the third set of weights.

In some cases, the CNN includes multiple convolution blocks, multiple dense layers, and a random forest classifier. A first one of the convolution blocks is configured to receive input visual data. The multiple dense layers are configured to generate a feature vector. The random forest classifier is configured to classify the reference optical fiber preforms into two or more categories using the feature vector.

In some cases, an inferencing computer (which may be the same as or different from the training computer, and which may include multiple computers) predicts, with the trained CNN, the performance data of a subject optical fiber preform. The subject optical fiber preform is distinct from the reference optical fiber preforms. The predicting may include providing an image of the subject optical fiber preform as input to the trained CNN. The performance data may be diameter upset or a length of fiber lost due to diameter upset. The inference computer may receive one or more images of the subject optical fiber preform as input.

In some implementations an inferencing computer (or combination of multiple inferencing computers) includes processing circuitry (e.g., one or more processing units) and memory. The memory stores the trained CNN, which may be received from the training computer (e.g., via a network or other connection). The trained CNN has been trained based on a first dataset (e.g., the stored dataset above) or a training dataset derived from the first dataset. The first dataset includes, for each of multiple reference optical fiber preforms, a plurality of images of the reference optical fiber preform labelled with performance data of optical fiber drawn from the optical fiber preform. Each image represents a different portion of the optical fiber preform. The processing circuitry receives a visual representation of a subject optical fiber preform. The subject optical fiber preform is distinct from the reference optical fiber preforms. The processing circuitry predicts, with the trained CNN and based on the visual representation, the performance data of the subject optical fiber preform. The processing circuitry provides an output representing the predicted performance data.

Some aspects are described below as numbered examples (Example 1, 2, 3, etc.). These numbered examples do not limit the technology disclosed herein.

Example 1 is a method for analyzing optical fiber preforms comprising: accessing a stored dataset comprising, for each of multiple reference optical fiber preforms, a plurality of images of the reference optical fiber preform labelled with performance data of optical fiber drawn from the reference optical fiber preform, wherein each image represents a different portion of the reference optical fiber preform; and training a convolutional neural network (CNN), the training comprising providing data to the convolutional neural network (CNN), the data comprising the stored dataset or a training dataset derived from the stored dataset, the convolutional neural network (CNN) processing the data to classify the reference optical fiber preforms into two or more categories.

In Example 2, the subject matter of Example 1 includes, preprocessing the stored dataset to generate the training dataset, the training dataset comprising modified images obtained from the plurality of images of the stored dataset, wherein the data comprises the training dataset.

In Example 3, the subject matter of Example 2 includes, wherein the preprocessing comprises enhancement of contrast, cropping, resizing, rescaling, editing or removing an image of the plurality of images of the stored dataset.

In Example 4, the subject matter of Examples 1-3 includes, wherein the performance data comprises manufacturing data.

In Example 5, the subject matter of Example 4 includes, wherein the manufacturing data comprises diameter upset or the length of fiber lost due to diameter upset.

In Example 6, the subject matter of Examples 1-5 includes, wherein the performance data comprises property data.

In Example 7, the subject matter of Example 6 includes, wherein the property data comprises refractive index.

In Example 8, the subject matter of Examples 1-7 includes, wherein the plurality of images of each of the reference optical fiber preforms comprises images acquired at two different angles about a central axis of the reference optical fiber preform.

In Example 9, the subject matter of Examples 1-8 includes, wherein the training further comprises extracting a feature from an image of the stored dataset or a modified image of the training dataset.

In Example 10, the subject matter of Example 9 includes, wherein the feature is extracted from a plurality of images of the stored dataset or a plurality of modified images of the training dataset.

In Example 11, the subject matter of Examples 9-10 includes, wherein the feature comprises a location of a particle in the reference optical fiber preform.

In Example 12, the subject matter of Example 11 includes, wherein the location comprises a radial location of the particle.

In Example 13, the subject matter of Examples 9-12 includes, wherein the feature comprises locations of a plurality of particles in the reference optical fiber preform.

In Example 14, the subject matter of Examples 9-13 includes, wherein the feature comprises a size of one or more particles in the reference optical fiber preform.

In Example 15, the subject matter of Examples 9-14 includes, wherein the feature comprises particle spacing in the reference optical fiber preform.

In Example 16, the subject matter of Examples 9-15 includes, wherein the two or more categories distinguish the reference optical fiber preforms on the basis of the feature.

In Example 17, the subject matter of Examples 1-16 includes, wherein the convolutional neural network (CNN) comprises an input layer, a plurality of hidden layers and an output layer; the plurality of hidden layers comprising a first layer connected to the input layer, a second layer connected to the output layer and one or more intermediate layers between the first layer and the second layer; each of the input layer, hidden layers and output layers comprising a plurality of artificial neurons.

In Example 18, the subject matter of Example 17 includes, wherein the artificial neurons of the input layer are connected to the artificial neurons of the first layer of the hidden layers with a connection strength defined by a first set of weights, the artificial neurons of the intermediate layers are connected to each other with a connection strength defined by a second set of weights, and the artificial neurons of the output layer are connected to the artificial neurons of the second layer with a connection strength defined by a third set of weights; and wherein the training comprises processing the data to establish one or more of the first set of weights, the second set of weights, and the third set of weights.

In Example 19, the subject matter of Examples 1-18 includes, wherein the convolutional neural network (CNN) comprises: a plurality of convolution blocks, wherein a first one of the convolution blocks is configured to receive input visual data; a plurality of dense layers following the plurality of convolution blocks, the plurality of dense layers configured to generate a feature vector; and a random forest classifier configured to classify the reference optical fiber preforms into the two or more categories using the feature vector.

In Example 20, the subject matter of Examples 1-19 includes, predicting, with the trained convolutional neural network (CNN), the performance data of a subject optical fiber preform, the subject optical fiber preform being distinct from the reference optical fiber preforms.

In Example 21, the subject matter of Example 20 includes, wherein the predicting comprises providing an image of the subject optical fiber preform as input to the trained convolutional neural network (CNN).

In Example 22, the subject matter of Examples 20-21 includes, wherein the performance data is diameter upset or a length of fiber lost due to diameter upset.

Example 23 is a training system comprising: processing circuitry; a memory storing a convolutional neural network (CNN); and the memory further storing instructions which, when executed by the processing circuitry, cause the processing circuitry to perform operations comprising: accessing a stored dataset comprising, for each of multiple reference optical fiber preforms, a plurality of images of the reference optical fiber preform labelled with performance data of optical fiber drawn from the optical fiber preform, wherein each image represents a different portion of the optical fiber preform; and training the convolutional neural network (CNN), the training comprising providing data to the convolutional neural network (CNN), the data comprising the stored dataset or a training dataset derived from the stored dataset, the convolutional neural network (CNN) processing the data to classify the reference optical fiber preforms into two or more categories.

In Example 24, the subject matter of Example 23 includes, the operations further comprising: preprocessing the stored dataset to generate the training dataset, the training dataset comprising modified images obtained from the plurality of images of the stored dataset, wherein the data comprises the training dataset.

In Example 25, the subject matter of Examples 23-24 includes, wherein the operations further comprise predicting, with the trained convolutional neural network (CNN), the performance data of a subject optical fiber preform, the subject optical fiber preform being distinct from the reference optical fiber preforms.

In Example 26, the subject matter of Examples 23-25 includes, wherein the processing circuitry is configured to receive one or more images of the subject optical fiber preform as input.

Example 27 is an inferencing system comprising: processing circuitry; a memory storing a trained convolutional neural network (CNN), wherein the trained CNN has been trained based on a first dataset or a training dataset derived from the first dataset, the first dataset comprising, for each of multiple reference optical fiber preforms, a plurality of images of the reference optical fiber preform labelled with performance data of optical fiber drawn from the optical fiber preform, wherein each image represents a different portion of the optical fiber preform; and the memory further storing instructions which, when executed by the processing circuitry, cause the processing circuitry to perform operations comprising: receiving a visual representation of a subject optical fiber preform, the subject optical fiber preform being distinct from the reference optical fiber preforms; predicting, with the trained CNN and based on the visual representation, the performance data of the subject optical fiber preform; and providing an output representing the predicted performance data.

Example 28 is at least one machine-readable medium including instructions that, when executed by processing circuitry, cause the processing circuitry to perform operations to implement of any of Examples 1-27.

Example 29 is an apparatus comprising means to implement of any of Examples 1-27.

Example 30 is a system to implement of any of Examples 1-27.

Example 31 is a method to implement of any of Examples 1-27.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for analyzing optical fiber preforms comprising:
    accessing a stored dataset comprising, for each of multiple reference optical fiber preforms, a plurality of images of the reference optical fiber preform labelled with performance data of optical fiber drawn from the reference optical fiber preform, wherein each image represents a different portion of the reference optical fiber preform; and
    training a convolutional neural network (CNN), the training comprising providing data to the convolutional neural network (CNN), the data comprising the stored dataset or a training dataset derived from the stored dataset, the convolutional neural network (CNN) processing the data to predict a number of fiber kilometers lost due to diameter upset in the reference optical fiber preform,
    wherein the convolutional neural network (CNN) comprises:
        an input layer;
        an output layer;
        a plurality of hidden layers comprising a first layer connected to the input layer, a second layer connected to the output layer and one or more intermediate layers between the first layer and the second layer, each of the input layer, hidden layers and output layers comprising a plurality of artificial neurons;
        a plurality of convolution blocks, wherein a first one of the convolution blocks is configured to receive input visual data;
        a plurality of dense layers following the plurality of convolution blocks, the plurality of dense layers configured to generate a feature vector; and
        a random forest classifier configured to classify the reference optical fiber preforms into the two or more categories using the feature vector.

2. The method of claim 1, further comprising:
    preprocessing the stored dataset to generate the training dataset, the training dataset comprising modified images obtained from the plurality of images of the stored dataset, wherein the data comprises the training dataset.

3. The method of claim 2, wherein the preprocessing comprises enhancement of contrast, cropping, resizing, rescaling, editing or removing an image of the plurality of images of the stored dataset.

4. The method of claim 1, wherein the performance data comprises manufacturing data.

5. The method of claim 4, wherein the manufacturing data comprises diameter upset or the length of fiber lost due to diameter upset.

6. The method of claim 1, wherein the performance data comprises property data.

7. The method of claim 6, wherein the property data comprises refractive index.

8. The method of claim 1, wherein the training further comprises extracting a feature from an image of the stored dataset or a modified image of the training dataset.

9. The method of claim 8, wherein the feature comprises a location of a particle in the reference optical fiber preform.

10. The method of claim 8, wherein the feature comprises a size of one or more particles in the reference optical fiber preform.

11. The method of claim 8, wherein the feature comprises particle spacing in the reference optical fiber preform.

12. The method of claim 1, further comprising:
    predicting, with the trained convolutional neural network (CNN), the performance data of a subject optical fiber preform, the subject optical fiber preform being distinct from the reference optical fiber preforms.

13. The method of claim 12, wherein the predicting comprises providing an image of the subject optical fiber preform as input to the trained convolutional neural network (CNN).

14. The method of claim 1, wherein training the convolutional neural network (CNN) comprises:
    computing, for each of the reference optical fiber preforms, radial positions of particles and axial position of the particles in each optical fiber preform, each radial position is computed using at least two images and an angular movement between the at least two images; and training the convolutional neural network (CNN) based on the radial positions of the particles, the axial positions of the particles, and relative positions of the particles to one another.

15. A training system comprising:

processing circuitry;

a memory storing a convolutional neural network (CNN); and the memory further storing instructions which, when executed by the processing circuitry, cause the processing circuitry to perform operations comprising:

accessing a stored dataset comprising, for each of multiple reference optical fiber preforms, a plurality of images of the reference optical fiber preform labelled with performance data, wherein each image represents a different portion of the reference optical fiber preform; and training the convolutional neural network (CNN), the training comprising providing data to the convolutional neural network (CNN), the data comprising the stored dataset or a training dataset derived from the stored dataset, the convolutional neural network (CNN) processing the data to predict a number of fiber kilometers lost due to diameter upset in the reference optical fiber preform, wherein the convolutional neural network (CNN) comprises:

an input layer;

an output layer;

a plurality of hidden layers comprising a first layer connected to the input layer, a second layer connected to the output layer and one or more intermediate layers between the first layer and the second layer, each of the input layer, hidden layers and output layers comprising a plurality of artificial neurons;

a plurality of convolution blocks, wherein a first one of the convolution blocks is configured to receive input visual data;

a plurality of dense layers following the plurality of convolution blocks, the plurality of dense layers configured to generate a feature vector; and a random forest classifier configured to classify the reference optical fiber preforms into the two or more categories using the feature vector.

16. The training system of claim 15, the operations further comprising:

preprocessing the stored dataset to generate the training dataset, the training dataset comprising modified images obtained from the plurality of images of the stored dataset, wherein the data comprises the training dataset.

17. The training system of claim 15, wherein the operations further comprise predicting, with the trained convolutional neural network (CNN), the performance data of a subject optical fiber preform, the subject optical fiber preform being distinct from the reference optical fiber preforms.

18. The training system of claim 15, wherein training the convolutional neural network (CNN) comprises:

computing, for each of the reference optical fiber preforms, radial positions of particles and axial position of the particles in each optical fiber preform, each radial position is computed using at least two images and an angular movement between the at least two images; and training the convolutional neural network (CNN) based on the radial positions of the particles, the axial positions of the particles, and relative positions of the particles to one another.

19. An inferencing system comprising:

processing circuitry;

a memory storing a trained convolutional neural network (CNN), wherein the trained CNN has been trained based on a first dataset or a training dataset derived from the first dataset, the first dataset comprising, for each of multiple reference optical fiber preforms, a plurality of images of the reference optical fiber preform labelled with performance data, wherein each image represents a different portion of the reference optical fiber preform; and the memory further storing instructions which, when executed by the processing circuitry, cause the processing circuitry to perform operations comprising:

receiving a visual representation of a subject optical fiber preform, the subject optical fiber preform being distinct from the reference optical fiber preforms;

predicting, with the trained CNN and based on the visual representation, a number of fiber kilometers lost due to diameter upset in the subject optical fiber preform; and providing an output representing the predicted number of fiber kilometers lost due to diameter upset, wherein the trained CNN comprises:

an input layer;

an output layer;

a plurality of hidden layers comprising a first layer connected to the input layer, a second layer connected to the output layer and one or more intermediate layers between the first layer and the second layer, each of the input layer, hidden layers and output layers comprising a plurality of artificial neurons;

a plurality of convolution blocks, wherein a first one of the convolution blocks is configured to receive input visual data;

a plurality of dense layers following the plurality of convolution blocks, the plurality of dense layers configured to generate a feature vector; and a random forest classifier configured to classify the reference optical fiber preforms into the two or more categories using the feature vector.

* * * * *